(12) United States Patent
Lee

(10) Patent No.: US 11,496,989 B2
(45) Date of Patent: Nov. 8, 2022

(54) POSITIONING NETWORK SYSTEM, APPARATUS AND METHOD USING A MOBILE OBJECT

(71) Applicant: DAEGU GYEONGBUK INSTITUTE OF SCIENCE AND TECHNOLOGY, Daegu (KR)

(72) Inventor: Sang Cheol Lee, Daegu (KR)

(73) Assignee: DAEGU GYEONGBUK INSTITUTE OF SCIENCE AND TECHNOLOGY, Daegu (KR)

( * ) Notice: Subject to any disclaimer, the term of this patent is extended or adjusted under 35 U.S.C. 154(b) by 42 days.

(21) Appl. No.: 17/186,567

(22) Filed: Feb. 26, 2021

(65) Prior Publication Data
US 2021/0282110 A1    Sep. 9, 2021

(30) Foreign Application Priority Data
Mar. 3, 2020 (KR) .......................... 10-2020-0026768

(51) Int. Cl.
*H04W 24/00* (2009.01)
*H04W 64/00* (2009.01)
*G01S 5/02* (2010.01)

(52) U.S. Cl.
CPC .......... *H04W 64/003* (2013.01); *G01S 5/021* (2013.01); *G01S 5/0284* (2013.01)

(58) Field of Classification Search
CPC .... H04W 64/003; G01S 5/021; G01S 5/0284; G01S 5/0205
USPC .................................................... 455/456.1
See application file for complete search history.

(56) References Cited

U.S. PATENT DOCUMENTS

| | | | |
|---|---|---|---|
| 7,605,756 B2 * | 10/2009 | Ash | G01C 21/206 342/463 |
| 2014/0162681 A1 * | 6/2014 | Noonan | H04W 4/021 455/456.1 |
| 2014/0329539 A1 * | 11/2014 | Li | H04W 64/00 455/456.1 |
| 2018/0027517 A9 * | 1/2018 | Noonan | H04W 64/00 455/456.1 |

FOREIGN PATENT DOCUMENTS

| | | |
|---|---|---|
| JP | 08-510552 | 11/1996 |
| JP | 2015055590 | 3/2015 |
| KR | 10-2010-0073744 | 7/2010 |

(Continued)

OTHER PUBLICATIONS

Sang C. Lee et al., "Anchor placement design for a decoupled simple trilateration algorithm", Journal of Nonlinear and Convex Analysis, 20(7), 1327-1339, 2019.

*Primary Examiner* — Tanmay K Shah
(74) *Attorney, Agent, or Firm* — Lex IP Meister, PLLC

(57) ABSTRACT

The present disclosure relates to a positioning network system, apparatus, and method using a mobile object, and more particularly, to a positioning network system, apparatus, and method using a mobile object, that are capable of improving positioning accuracy while reducing an amount of calculation for positioning by arranging a plurality of positioning nodes included in a positioning mobile object in a right angle direction, and also efficiently expanding a positionable region by using a plurality of positioning mobile objects or an intermediate mobile object.

15 Claims, 13 Drawing Sheets

(56) References Cited

FOREIGN PATENT DOCUMENTS

| KR | 10-2010-0086093 | 7/2010 |
| KR | 10-2012-0049530 | 5/2012 |
| KR | 10-2014-0137815 | 12/2014 |
| KR | 10-2016-0089039 | 7/2016 |
| KR | 10-2016-0121160 | 10/2016 |
| KR | 10-2019-0084405 | 7/2019 |
| KR | 10-2019-0143728 | 12/2019 |

\* cited by examiner (a)

(b)

POSITIONING NETWORK SYSTEM, APPARATUS AND METHOD USING A MOBILE OBJECT

CROSS-REFERENCE TO RELATED APPLICATION

The present application claims benefit of priority to Korean Patent Application No. 10-2020-0026760, entitled "Positioning network system, apparatus and method using heterogeneous moving object" filed on Mar. 3, 2020 and Korean Patent Application No. 10-2020-0026768, entitled "Positioning network system, apparatus and method using homogeneous moving object" filed on Mar. 3, 2020 in the Korean Intellectual Property Office, the entirety of which is incorporated by reference herein.

BACKGROUND

1. Technical Field

The present disclosure relates to a positioning network system, apparatus, and method using heterogeneous or homogeneous positioning mobile objects, and more particularly, to a positioning network system, apparatus, and method using a mobile object, that are capable of improving positioning accuracy while reducing an amount of calculation for positioning by arranging a plurality of positioning nodes included in a positioning mobile object in a right angle direction, and also efficiently expanding a positionable region by using a plurality of positioning mobile objects or an intermediate mobile object.

2. Background

Recently, location-based service (LBS) technology based on location information has been widely used. As a representative example of this, navigation devices that receive, for example, GPS signals, and then position the current location of a user or provide guidance to the user regarding a movement route to a destination, have been widely used.

However, in positioning technology based on, for example, GPS as described above, positioning may be easy outdoors where GPS satellite signals may be received smoothly, but positioning may be impossible or positioning accuracy may be lowered indoors, where the GPS satellite signals may be difficult to receive or signal distortion may occur.

In this regard, in the related art, as shown in FIG. 1, a technology was also used that calculates the location of a target node located in an inner region of a plurality of positioning nodes by installing positioning nodes at a plurality of predetermined indoor locations and measuring the distances from the target node to each of the plurality of positioning nodes.

However, in the above case, there is a limitation in that the target node in the positionable region can only be positioned when the plurality of positioning nodes are installed at predetermined locations so as to cover the entire region to be positioned.

In this regard, it would be desirable to position the target node by using, for example, a mobile object including a positioning node, but in this case, the calculation for calculating the location of the target node may be very complicated, and the positioning accuracy for the target node may be lowered.

Further, even if the positioning mobile object including the positioning node is used, since a positionable region of the positioning mobile object may be limited by, for example, a positionable radius, it may still be difficult to position a target node that is far from a positioning reference point.

As a result, although there is a need for a specific method capable of positioning the target node without installing a plurality of positioning nodes at predetermined locations in the region to be positioned, of positioning the target node with high accuracy without complicating the calculation for positioning, and of positioning the target node far from the positioning reference point by expanding the positionable region while minimizing the required cost, such a method has not yet been provided.

RELATED ART DOCUMENT

Related Art: Korean Patent Application Publication No. 10-2019-0084405 (2019 Jul. 17)

SUMMARY

The present disclosure is directed to addressing the disadvantages of the related art as described above. The present disclosure is directed to providing a positioning network system, apparatus, and method, that are capable of positioning a target node without installing a plurality of positioning nodes at predetermined locations in a region to be positioned, of positioning the target node with high accuracy without complicating a calculation for positioning, and of positioning the target node far from a positioning reference point by expanding a positionable region while minimizing a required cost.

In addition, the detailed purposes of the present disclosure will be understood by those skilled in the art from the detailed description set forth below.

A positioning network system for positioning an object by using a plurality of positioning mobile objects and at least one intermediate mobile object according to an embodiment of the present disclosure includes the plurality K of positioning mobile objects each including a plurality of positioning nodes, the plurality of positioning nodes including a first positioning node $N_A$, a second positioning node $N_B$, and a third positioning node $N_C$; an intermediate mobile object including an intermediate node $N_I$; and the object including a target node $N_T$, wherein at the plurality of positioning mobile objects, the second positioning node $N_B$ and the third positioning node $N_C$ are located in a direction forming a right angle at the first positioning node $N_A$ in a right-angled triangle structure, wherein a first positioning mobile object of the plurality of positioning mobile objects is configured to position the first positioning mobile object based on a predetermined reference point by using a plurality of positioning nodes $N_{A1}$, $N_{B1}$, and $N_{C1}$, wherein at least one $m^{th}$ positioning mobile object of the plurality of positioning mobile objects is configured to position an adjacent ($m\pm1^{th}$) positioning mobile object or the intermediate mobile object based on the $m^{th}$ positioning mobile object by using a plurality of positioning nodes $N_{Am}$, $N_{Bm}$, and $N_{Cm}$, where $1<m<K$, and wherein a $K^{th}$ positioning mobile object of the plurality of positioning mobile objects is configured to position the object based on the $K^{th}$ positioning mobile object by using a plurality of positioning nodes $N_{AK}$, $N_{BK}$, and $N_{CK}$.

At this time, the second positioning node $N_B$ and the third positioning node $N_C$ may be located at the same distance from the first positioning node $N_A$ in a right-angled isosceles triangle structure.

In addition, the plurality of positioning mobile objects may be configured to calculate a location $X_{AD}$, $Y_{AD}$ of a node to be positioned $N_D$ based on the first positioning node $N_A$ of the plurality of positioning mobile objects by calculating a first distance $X_{AD}$ from the first positioning node $N_A$ to the node to be positioned $N_D$ on a first axis (X axis) connecting the first positioning node $N_A$ and the second positioning node $N_B$, and calculating a second distance $Y_{AD}$ from the first positioning node $N_A$ to the node to be positioned $N_D$ on a second axis (Y axis) connecting the first positioning node $N_A$ and the third positioning node $N_C$.

Further, the plurality of positioning mobile objects may be configured to calculate the first distance $X_{AD}$ without considering a location value $Y_D$ of the node to be positioned $N_D$ on the Y axis, and calculate the second distance $Y_{AD}$ without considering the location value $X_D$ of the node to be positioned $N_D$ on the X axis.

In addition, the plurality of positioning mobile objects may be configured to calculate the distance to the node to be positioned $N_D$ by causing the plurality of positioning nodes $N_A$, $N_B$, and $N_C$ to transmit and receive an RF signal to and from the node to be positioned $N_D$, and calculate a relative location of the node to be positioned $N_D$ based on the plurality of positioning mobile object.

In addition, the first positioning mobile object may be further configured to position a second positioning mobile object or a second intermediate mobile object based on the first positioning mobile object by using the plurality of positioning nodes $N_{A1}$, $N_{B1}$, and $N_{C1}$, and the $m^{th}$ positioning mobile object may be further configured to position an $m-1^{th}$ positioning mobile object or the intermediate mobile object together with an $m+1^{th}$ positioning mobile object or the intermediate mobile object based on the $m^{th}$ positioning mobile object by using the plurality of positioning nodes $N_{Am}$, $N_{Bm}$, and $N_{Cm}$, where $1<m<K$.

In addition, the first positioning mobile object may be further configured to position a second positioning mobile object based on the first positioning mobile object by using the plurality of positioning nodes $N_{A1}$, $N_{B1}$, and $N_{C1}$, and the $m^{th}$ positioning mobile object may be configured to position the $m+1^{th}$ positioning mobile object based on the $m^{th}$ positioning mobile object by using the plurality of positioning nodes $N_{Am}$, $N_{Bm}$, and $N_{Cm}$, where $1<m<K$.

In addition, the positioning network system further includes a location calculator for calculating the location of the object based on the reference point, wherein the location calculator may be configured to calculate the location of the object by sequentially summing the location information of at least two of the plurality of positioning mobile objects and the intermediate mobile object.

At this time, the location calculator may be further configured to calculate location information of the object based on the reference point by sequentially summing location information of the first positioning mobile object based on the reference point, location information of the adjacent $(m\pm1^{th})$ positioning mobile object or the intermediate mobile object based on the $m^{th}$ positioning mobile object, and location information of the object based on the $K^{th}$ positioning mobile object.

In addition, a positioning method for positioning an object by using a plurality of positioning mobile objects and at least one intermediate mobile object according to another embodiment of the present disclosure includes positioning, at a first positioning mobile object of a plurality K of positioning mobile objects each including a plurality of positioning nodes, the first positioning mobile object based on a predetermined reference point by using a plurality of positioning nodes $N_{A1}$, $N_{B1}$, and $N_{C1}$, the plurality of positioning nodes including a first positioning node $N_A$, a second positioning node $N_B$, and a third positioning node $N_C$; positioning, at an $m^{th}$ positioning mobile object of the plurality of positioning mobile objects, an adjacent $(m+1)^{th}$ positioning mobile object or the intermediate mobile object based on the $m^{th}$ positioning mobile object by using a plurality of positioning nodes $N_{Am}$, $N_{Bm}$, and $N_{Cm}$, where $1<m<K$; and positioning, at a $K^{th}$ positioning mobile object of the plurality of positioning mobile objects, the object based on the $K^{th}$ positioning mobile object by using a plurality of positioning nodes $N_{AK}$, $N_{BK}$, and $N_{CK}$, wherein the object includes a target node $N_T$, wherein the intermediate mobile object includes an intermediate node $N_I$, and wherein at the plurality of positioning mobile objects, the second positioning node $N_B$ and the third positioning node $N_C$ are located in a direction forming a right angle at the first positioning node $N_A$ in a right-angled triangle structure, At this time, the second positioning node $N_B$ and the third positioning node $N_C$ may be located at the same distance from the first positioning node $N_A$ in a right-angled isosceles triangle structure.

In addition, the first positioning mobile object may be configured to position a second positioning mobile object or a second intermediate mobile object based on the first positioning mobile object by using the plurality of positioning nodes $N_{A1}$, $N_{B1}$, and $N_{C1}$, and the $m^{th}$ positioning mobile object may be configured to position an $m-1^{th}$ positioning mobile object or the intermediate mobile object together with an $m+1^{th}$ positioning mobile object or the intermediate mobile object based on the $m^{th}$ positioning mobile object by using the plurality of positioning nodes $N_{Am}$, $N_{Bm}$, and $N_{Cm}$, where $1<m<K$.

In addition, the first positioning mobile object may be further configured to position a second positioning mobile object based on the first positioning mobile object by using the plurality of positioning nodes $N_{A1}$, $N_{B1}$, and $N_{C1}$, and the $m^{th}$ positioning mobile object may be further configured to position the $m+1^{th}$ positioning mobile object based on the $m^{th}$ positioning mobile object by using the plurality of positioning nodes $N_{Am}$, $N_{Bm}$, and $N_{Cm}$, where $1<m<K$.

In addition, the positioning method may further include calculating the location of the object based on the reference point by sequentially summing the location information of at least two of the plurality of positioning mobile objects and the intermediate mobile object.

Here, calculating the location may include calculating location information of the object based on the reference point by sequentially summing location information of the first positioning mobile object based on the reference point, location information of the adjacent $(m\pm1^{th})$ positioning mobile object or the intermediate mobile object based on the $m^{th}$ positioning mobile object, and location information of the object based on the $K^{th}$ positioning mobile object.

According to the positioning network system, apparatus, and method using heterogeneous positioning mobile objects according to embodiments of the present disclosure, the target node can be positioned without installing the plurality of positioning nodes at the predetermined locations in the region to be positioned, the target node can be positioned with high accuracy without complicating the calculation for positioning, and the target node far from the positioning reference point can be positioned by expanding the positionable region while minimizing the required cost.

BRIEF DESCRIPTION OF THE DRAWINGS

The accompanying drawings, which are included as part of the detailed description to aid in the understanding of the present disclosure, provide embodiments for the present disclosure, and describe the technical idea of the present disclosure in connection with the detailed description.

DETAILED DESCRIPTION

The present disclosure may allow for various changes and have various embodiments, and thus specific embodiments will be described in detail below with reference to the accompanying drawings.

The embodiments described below are provided to aid in a comprehensive understanding of the method, apparatus, and/or system described herein. However, these embodiments are only for illustrating the present disclosure, and thus the present disclosure should not be limited thereto.

In describing the embodiments of the present disclosure, when it is determined that a detailed description of known technologies related to the present disclosure may unnecessarily obscure the subject matter of the present disclosure, the detailed description thereof will be omitted. In addition, terms described below are defined in consideration of functions of the present disclosure, and may vary depending on the custom or intention of user or operator. Therefore, definitions of these terms should be made based on the contents throughout the specification. The terms used in the detailed description are only for describing the embodiments of the present disclosure, and should not be regarded as limiting. The singular expressions "a," "an," and "the" include plural expressions unless the context clearly dictates otherwise. It should be understood that the terms "comprises," "comprising," "includes," "including," "containing," "has," "having" or any other variation thereof specify the presence of features, integers, steps, operations, elements, components, or combinations thereof described herein, but do not preclude the presence or addition of one or more other features, integers, steps, operations, elements, components, or combinations thereof.

In addition, although the terms "first", "second", and the like may be used herein to describe various elements, these elements should not be limited by these terms. These terms may be only used to distinguish one element from another element.

Hereinafter, exemplary embodiments of a positioning network system, apparatus, and method using heterogeneous positioning mobile objects according to an embodiment of the present disclosure will be described in detail with reference to the accompanying drawings.

First, an embodiment of a positioning network system, apparatus, and method using heterogeneous and homogeneous positioning mobile objects will be described.

Figure 1:
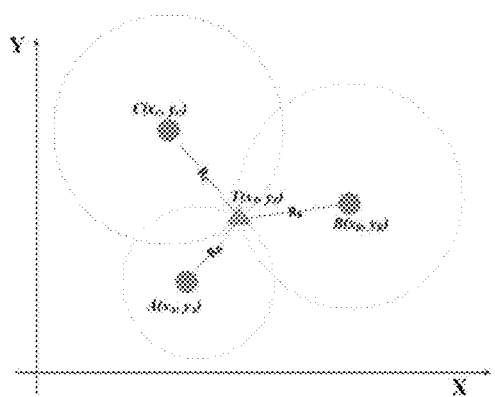
FIG. 1 is a diagram illustrating a positioning network system according to the related art.
Figure 2:
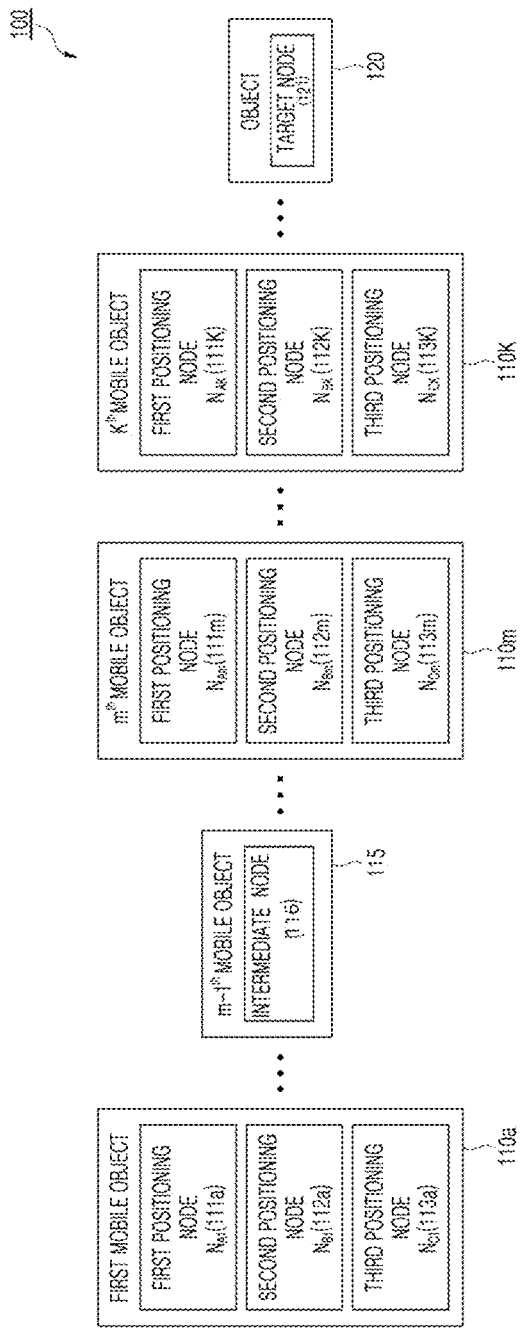
FIG. 2 is a diagram illustrating the configuration of a positioning network system according to an embodiment of the present disclosure.

FIG. 2 illustrates the configuration of a positioning network system 100 according to an embodiment of the present disclosure. As can be seen in FIG. 2, the positioning network system 100 according to an embodiment of the present disclosure is a positioning network system 100 for positioning an object 120 by using a plurality of mobile positioning objects 110 and at least one intermediate mobile object 115. The positioning network system 100 may include the plurality K of positioning mobile objects 110 each including a plurality of positioning nodes including a first positioning node $N_A$ 111, a second positioning node $N_B$ 112, and a third positioning node $N_C$ 113, the intermediate mobile object 115 including an intermediate node $N_I$ 116, and an object 120 including a target node $N_T$ 121.

Here, it is preferable that at the plurality of positioning mobile objects 110, the second positioning node $N_B$ 112 and the third positioning node $N_C$ 113 are located in a direction forming a right angle at the first positioning node $N_A$ 111 in a right-angled triangle structure, and the second positioning node $N_B$ 112 and the third positioning node $N_C$ 113 are located at the same distance from the first positioning node $N_A$ 111 in a right-angled isosceles triangle structure.

At this time, a first positioning mobile object 110a of the plurality of positioning mobile objects 110 may position the first positioning mobile object 110a based on a predetermined reference point 130 by using a plurality of positioning nodes $N_{A1}$, $N^{B1}$, and $N_{C1}$, at least one $m^{th}$ positioning mobile object 110m of the plurality of positioning mobile objects 110 may position an adjacent $(m\pm1)^{th}$ positioning mobile object (that is, 110m+1 or 110m−1) or an intermediate mobile object (that is, 115m+1 or 115m−1) based on the $m^{th}$ positioning mobile object 110m by using a plurality of positioning nodes $N_{Am}$, $N_{Bm}$, and $N_{Cm}$ (where 1<m<K), and a $K^{th}$ positioning mobile object 110K of the plurality of positioning mobile objects 110 may position the object 120 based on the $K^{th}$ positioning mobile object 110K by using a plurality of positioning nodes $N_{AK}$, $N_{BK}$, and $N_{CK}$.

In addition, the plurality of positioning mobile objects 110 may calculate a location $X_{AD}$, $Y_{AD}$ of a node to be positioned $N_D$ based on the first positioning node $N_A$ 111 of the plurality of positioning mobile objects 110 by calculating a first distance $X_{AD}$ from the first positioning node $N_A$ 111 to the node to be positioned $N_D$ on a first axis (X axis) connecting the first positioning node $N_A$ 111 and the second positioning node $N_B$ 112, and calculating a second distance $Y_{AD}$ from the first positioning node $N_A$ 111 to the node to be positioned $N_D$ on a second axis (Y axis) connecting the first positioning node $N_A$ 111 and the third positioning node $N_C$ 113.

In addition, the positioning network system 100 according to an embodiment of the present disclosure may include a location calculator 140 for calculating the location of the object 120 based on the reference point 130, and the location calculator 140 may calculate the location of the object 120 by sequentially summing location information of at least two of the plurality of positioning mobile objects 110 and the intermediate mobile object 115.

At this time, the location calculator 140 may be implemented in one or two or more of the plurality of positioning mobile objects 110, or may be implemented in a separate device, such as a server, capable of exchanging data with the plurality of positioning mobile objects 110 through, for example, wireless communication.

More specifically, the location calculator 140 may calculate location information of the object 120 based on the reference point 130 by sequentially summing location information of the first positioning mobile object 110a based on the reference point 130, location information of the adjacent $(m\pm1^{th})$ positioning mobile object (that is, 110m+1 or 110m−1) or the intermediate mobile object (that is, 115m+1 or 115m−1) based on the $m^{th}$ positioning mobile object 110m, and location information of the object 120 based on the $K^{th}$ positioning mobile object 110K.

As a result, in the positioning network system 100 according to an embodiment of the present disclosure, the object 120 may be positioned without installing the plurality of positioning nodes at the predetermined locations in the region to be positioned, the object 120 may be positioned with high accuracy without complicating the calculation for positioning the object 120, and the object 120 far from the reference point 130 may be positioned by expanding a positionable region.

Hereinafter, with reference to FIG. 2, the positioning network system 100 according to an embodiment of the present disclosure will be described in detail for each of components thereof.

First, the plurality of positioning mobile objects 110 may include the plurality of positioning nodes including the first positioning node $N_A$ 111, the second positioning node $N_B$ 112, and the third positioning node $N_C$ 113.

Figure 3:
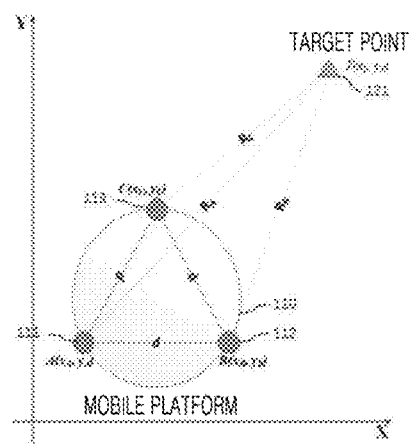
FIGS. 3 and 4 are diagrams illustrating the operation of a positioning network system according to an embodiment of the present disclosure.
Figure 3:
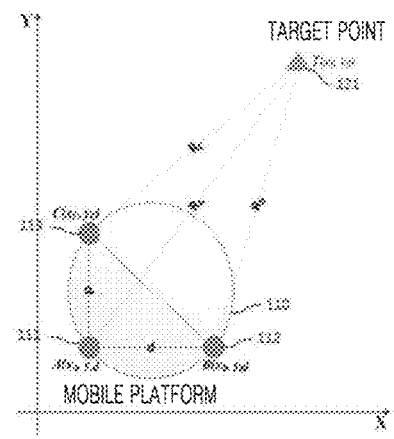

More specifically, FIG. 3 illustrates the configuration and the operation of the positioning mobile object 110 according to an embodiment of the present disclosure.

First, as can be seen in FIG. 3(a), at the positioning mobile object 110, the first positioning node $N_A$ 111, the second positioning node $N_B$ 112, and the third positioning node $N_C$ 113 may be arranged to form an equilateral triangle. However, in this case, the positioning mobile object 110 calculates the distances $R_A$, $R_B$, $R_C$ from each of the first positioning node $N_A$ 111, the second positioning node $N_B$ 112, and the third positioning node $N_C$ 113 to the node to be positioned $N_D$, such as the target node $N_T$ 121 included in the object 120. As a result, the calculated location of the target node $N_T$ 121 based on the first positioning node $N_A$ 111 by using the distances $R_A$, $R_B$, $R_C$ may be expressed as Equation 1 below:

$$x_{TA} = \frac{R_A^2 - R_B^2 + d^2}{2d}, \qquad (1)$$

$$y_{TA} = \frac{R_A^2 - R_C^2 + d^2}{\sqrt{3}\,d} - \frac{1}{\sqrt{3}} x_T.$$

Here, as can be seen in FIG. 3(a), $X_{TA}$ refers to a first distance from the first positioning node $N_A$ 111 to the target node $N_T$ 121 on the first axis (X axis) connecting the first positioning node $N_A$ 111 and the second positioning node $N_B$ 112, and $Y_{TA}$ refers to a second distance from the first positioning node $N_A$ 111 to the target node $N_T$ 121 on the second axis (Y axis) connecting the first positioning node $N_A$ 111 and the third positioning node $N_C$ 113.

In addition, d refers to the distances between the first positioning node $N_A$ 111 and the second positioning node $N_B$ 112, between the first positioning node $N_A$ 111 and the third positioning node $N_C$ 113, and between the second positioning node $N_B$ 112 and the third positioning node $N_C$ 113, and $X_T$ refers to the location of the target node $N_T$ 121 on the X axis.

At this time, as can be seen in Equation 1, the location value $X_T$ of the target node $N_T$ 121 on the X axis is reflected to obtain the second distance $Y_{TA}$.

On the other hand, as can be seen in FIG. 3(b), in the positioning network system 100 according to an embodiment of the present disclosure, at the positioning mobile object 110, the second positioning node $N_B$ 112 and the third positioning node $N_C$ 113 are located in a direction forming a right angle at the first positioning node $N_A$ 111 in a right-angled triangle structure.

As a result, the calculated location of the target node $N_T$ 121 based on the first positioning node $N_A$ 111 may be expressed as Equation 2 below:

$$\frac{R_A^2 - R_B^2 + d^2}{2d} = x_{TA}, \qquad (2)$$

$$\frac{R_A^2 - R_C^2 + d^2}{2d} = y_{TA}.$$

Here, $X_{TA}$ refers to a first distance from the first positioning node $N_A$ 111 to the target node $N_T$ 121 on the first axis (X axis) connecting the first positioning node $N_A$ 111 and the second positioning node $N_B$ 112, and $Y_{TA}$ refers to a second distance from the first positioning node $N_A$ 111 to the target node $N_T$ 121 on the second axis (Y axis) connecting the first positioning node $N_A$ 111 and the third positioning node $N_C$ 113.

In addition, d refers to the distances from the first positioning node $N_A$ 111 to each of the second positioning node $N_B$ 112 and the third positioning node $N_C$ 113.

At this time, as can be seen in Equation 2, it is possible to calculate the first distance $X_{TA}$ without considering a location value $Y_T$ of the target node $N_T$ on the Y axis, and to calculate the second distance $Y_{TA}$ without considering a location value $X_T$ of the target node $N_T$ on the X axis.

That is, in the positioning network system 100 according to an embodiment of the present disclosure, since at the plurality positioning mobile objects 110, the second positioning node $N_B$ 112 and the third positioning node $N_C$ 113 may be located in a direction forming a right angle at the first positioning node $N_A$ 111 in a right-angled triangle structure, the value on the X axis and the value on the Y axis do not affect each other (that is, decoupling). Therefore, the distance $R_A$ from the first positioning node $N_A$ 111 to the target node $N_T$ 121 is commonly reflected to obtain both $X_{TA}$ and $Y_{TA}$, while the distance $R_B$ from the second positioning node $N_B$ 112 to the target node $N_T$ 121 is reflected only to obtain $X_{TA}$, and the distance $R_C$ from the third positioning node $N_C$ 113 to the target node $N_T$ 121 is reflected only to obtain $Y_{TA}$.

Accordingly, in the positioning network system 100 according to an embodiment of the present disclosure, as can be seen in Equation 2, since the value on the X axis and the value on the Y axis do not affect each other (that is, decoupling), the first distance $X_{TA}$ and the second distance $Y_{TA}$ can be calculated through a simpler calculation.

In particular, Equation 2 is for the case of a two-dimensional plane, but in the case of higher dimensions such as three-dimensions, Equation 2 becomes more complex, and thus more complex calculations should be performed.

Further, Equation 2 is for calculating the location of the object 120 based on the positioning mobile object 110, but in a more complicated situation in which the first distance $X_{TA}$ and the second distance $Y_{TA}$ are required to be calculated in a multi-stage connection structure in which another positioning mobile object 110 or another object 120 between the positioning mobile object 110 and the object 120 is additionally connected, it is possible to concisely model an equation for calculating the first distance $X_{TA}$ and the second distance $Y_{TA}$, and to effectively reduce an amount of calculation required therefor, by making the value on the X axis and the value on the Y axis not affect each other (that is, decoupling).

In addition, in the positioning network system 100 according to an embodiment of the present disclosure, it is possible to calculate the distance to the node to be positioned $N_D$ by causing the plurality of positioning nodes $N_A$, $N_B$, and $N_C$ to transmit and receive an RF signal to and from the node to be positioned $N_D$, and to calculate a relative location of the node to be positioned $N_D$ based on the positioning mobile object 110 by using the calculated distance.

At this time, although it is possible to calculate the distance to the node to be positioned $N_D$ by using, for example, a Time of Flight (ToF) technique while causing the plurality of positioning nodes $N_A$, $N_B$, and $N_C$ to transmit and receive the RF signal to and from the node to be positioned $N_D$, the present disclosure is not limited thereto, and may also calculate the distance to the node to be positioned $N_D$ by applying various techniques such as phase shift or frequency modulation.

Here, although the node to be positioned $N_D$ may be the target node $N_T$ 121 of the object 120, the reference node 131 of the reference point 130, the first positioning node $N_A$ 111 of another positioning mobile object 110, or the intermediate node 116 of the intermediate mobile object 115, the present disclosure is not necessarily limited thereto, and may use various nodes such as a second positioning node $N_B$ 112 or a third positioning node $N_C$ 113 of the other positioning mobile object 110, or a separate fourth positioning node.

In addition, in the positioning network system 100 according to an embodiment of the present disclosure, the positioning mobile object 110 may position not only a front node $N_D$, but also a rear node $N_D$.

Figure 4:
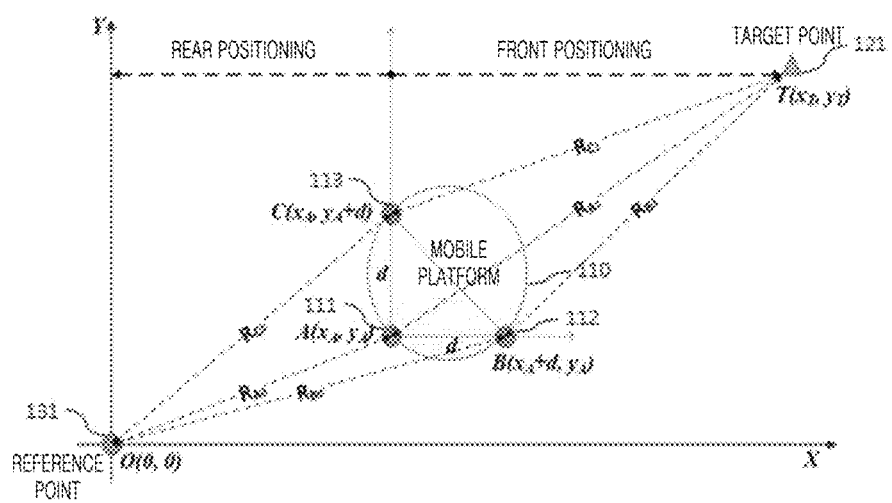

As can be seen in FIG. 4 as a more specific example, the positioning mobile object 110 may transmit and receive the RF signal to and from the node to be positioned $N_D$, such as a target node $N_T$ of a front object 120, a first positioning node $N_A$ of another positioning mobile object 110, or the intermediate node 116 of the intermediate mobile object 115 by using the plurality of positioning nodes $N_A$, $N_B$, and $N_C$, such that it may perform a front positioning for the node to be positioned $N_D$. In addition, the positioning mobile object mobile object 110 may transmit and receive the RF signal to and from the node to be positioned $N_D$, such as a reference node 131 of a rear reference point 130, the first positioning node $N_A$ of another positioning mobile object 110, or the intermediate node 116 of the intermediate mobile object 115, such that it may perform a rear positioning for the node to be positioned $N_D$.

Accordingly, in FIG. 4, after the front positioning for the object 120 and the rear positioning for the reference point 130 are performed, calculating, through a vector sum, the location of the target node $N_T$ 121 of the object 120 based on the reference node 131 of the reference point 130 may be expressed as Equation 3 below:

$$x_T = \frac{R_{B_0}^2 - R_{A_0}^2}{2d} + \frac{R_{A_1}^2 - R_{B_1}^2}{2d}, \qquad (3)$$
$$y_T = \frac{R_{C_0}^2 - R_{A_0}^2}{2d} + \frac{R_{A_1}^2 - R_{C_1}^2}{2d}.$$

Here, $X_{TA}$ refers to a first distance from the reference node 131 to the target node $N_T$ 121 on the first axis (X axis) connecting the first positioning node $N_A$ 111 and the second positioning node $N_B$ 112, and $Y_{TA}$ refers to a second distance from the reference node 131 to the target node $N_T$ 121 on the second axis (Y axis) connecting the first positioning node $N_A$ 111 and the third positioning node $N_C$ 113.

In addition, as can be seen in FIG. 4, $R_{A0}$, $R_{B0}$, $R_{C0}$ refer to the distances from the reference node 131 to each of the positioning nodes $N_A$, $N_B$, $N_C$ of the positioning mobile object 110, $R_{A1}$, $R_{B1}$, $R_{C1}$ refer to the distances from each of the positioning nodes $N_A$, $N_B$, $N_C$ of the positioning mobile object 110 to the target node $N_T$ of the object 120, and d refers to the distances from the first positioning node $N_A$ 111 to each of the second positioning node $N_B$ 112 and the third positioning node $N_C$ 113.

More specifically, the location of the reference node 131 of the reference point 130 may be measured and stored in advance. As a result, it is possible to calculate the distances $R_{A0}$, $R_{B0}$, $R_{C0}$ from each of the first positioning node $N_A$ 111, the second positioning node $N_B$ 112, and the third positioning node $N_C$ 113 of the positioning mobile object 110 to the reference node 131 by exchanging the RF signal between the first positioning node $N_A$ 111, the second positioning node $N_B$ 112, and the third positioning node $N_C$ 113, and the reference node 131, and to calculate the locations of the first positioning node $N_A$ 111, the second positioning node $N_B$ 112, and the third positioning node $N_C$ 113 by using the location of the reference node 131.

Further, when the locations of the first positioning node $N_A$ 111, the second positioning node $N_B$ 112, and the third positioning node $N_C$ 113 are calculated, it is possible to calculate the location (T($X_T$, $Y_T$) in FIG. 4) of the target node 131 based on the location ((0,0) in FIG. 4) of the reference node 131 in consideration of location information of the object 120 based on the positioning mobile object 110.

Figure 5:
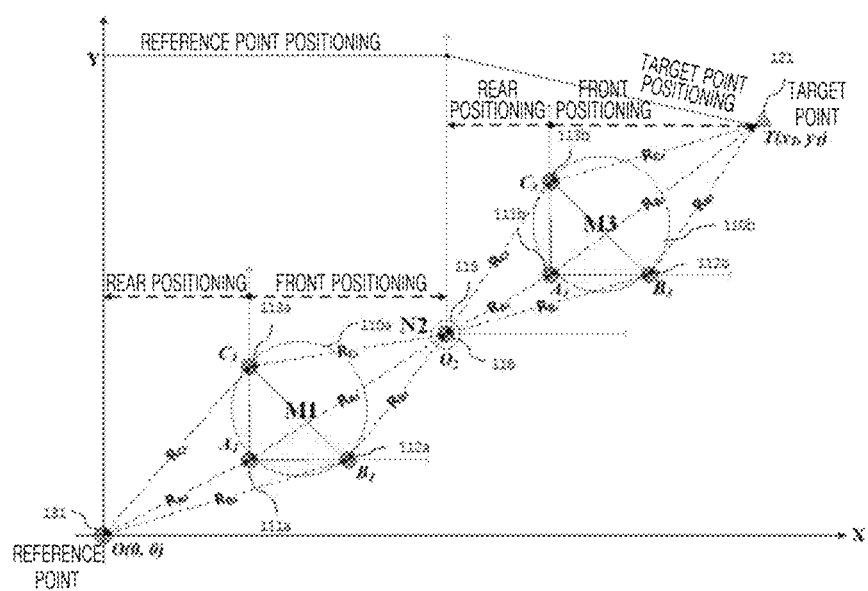
FIGS. 5 and 6 are diagrams illustrating the operation of a positioning network system including positioning mobile objects and intermediate mobile objects according to an embodiment of the present disclosure.

In addition, FIG. 5 is a diagram illustrating the operation of the positioning network system 100 including the plurality of positioning mobile objects 110 and the at least one intermediate mobile object 115 according to an embodiment of the present disclosure.

FIG. 5 illustrates the configuration for positioning the object 120 by using two positioning mobile objects 110 and one intermediate mobile object 115, but this is only for illustrating the explanation, and thus the present disclosure should not be limited thereto.

First, as can be seen in FIG. 5, a first positioning mobile object 110a performs a rear positioning for the reference node 131 of the reference point 130 by using a first positioning node 111a, a second positioning node 112a, and a third positioning node 113a.

In addition, the first positioning mobile object 110a performs a front positioning for the intermediate node 116 of the intermediate mobile object 115 by using the first positioning node 111a, the second positioning node 112a, and the third positioning node 113a.

Subsequently, the second positioning mobile object 110b performs the rear positioning for the intermediate node 116 of the intermediate mobile object 115 by using the first positioning node 111b, the second positioning node 112b, and the third positioning node 113b.

Further, the second positioning mobile object 110b performs the front positioning for the target node 121 of the object 120 by using the first positioning node 111b, the second positioning node 112b, and the third positioning node 113b.

As a result, in the positioning network system 100 according to an embodiment of the present disclosure, the location of the object 120 may be calculated through the vector sum by using location information of the first positioning node 111a of the first positioning mobile object 110a based on the reference node 131, position information of the intermediate node 116 of the intermediate mobile object 115 based on the first positioning node 111a of the first positioning mobile object 110a, location information of the first positioning node 111b of the second positioning mobile object 110b based on the intermediate node 116, and location information of the target node 121 based on the first positioning node 111b of the second positioning mobile object 110b, as in Equation 4 below:

$$\vec{TO} = \vec{TO_2} + \vec{O_2O}$$

$$\vec{O_2O} = \vec{O_2A_1} + \vec{A_1O}$$

$$\vec{TO_2} = \vec{A_3O_2} + \vec{TA_3} \quad (4)$$

In addition, when written in the same form as Equation 3, Equation 4 may be expressed as Equation 5 below:

$$x_T = \left(\frac{R_{B_0}^2 - R_{A_0}^2}{2d}\right) + \left(\frac{R_{A_1}^2 - R_{B_1}^2}{2d}\right) + \left(\frac{R_{B_2}^2 - R_{A_2}^2}{2d} + \frac{R_{A_3}^2 - R_{B_3}^2}{2d}\right), \quad (5)$$

$$y_T = \left(\frac{R_{C_0}^2 - R_{A_0}^2}{2d}\right) + \left(\frac{R_{A_1}^2 - R_{C_1}^2}{2d}\right) + \left(\frac{R_{C_2}^2 - R_{A_2}^2}{2d} + \frac{R_{A_3}^2 - R_{C_3}^2}{2d}\right).$$

Here, $X_T$ refers to the distance from the reference node 131 to the target node 121 on the first axis (X axis), and $Y_T$ refers to the distance from the reference node 131 to the target node 121 on the second axis (Y axis).

Further, although FIG. 5 illustrates calculating the location of the object 120 by connecting two positioning mobile objects 110 and one intermediate mobile object 115, calculating the location of the object 120 by connecting k positioning mobile objects 110 and k/2 intermediate mobile objects 115 may be expressed as Equation 6 below:

$$x_T = \sum_{i=0}^{k/2-1} \frac{R_{B_{2i}}^2 - R_{A_{2i}}^2}{2d} + \sum_{i=0}^{k/2-1} \frac{R_{A_{2i+1}}^2 - R_{B_{2i+1}}^2}{2d}, \quad (6)$$

$$y_T = \sum_{i=0}^{k/2-1} \frac{R_{C_{2i}}^2 - R_{A_{2i}}^2}{2d} + \sum_{i=0}^{k/2-1} \frac{R_{A_{2i+1}}^2 - R_{C_{2i+1}}^2}{2d}.$$

At this time, although Equation 6 corresponds to the case of using k positioning mobile objects 110 and k/2 intermediate mobile objects 115, this is only for illustrating the present disclosure, and thus the present disclosure should not be limited thereto.

As a result, in the positioning network system 100 according to an embodiment of the present disclosure, the target node 121 of the object 120 may be positioned by interlocking the plurality of positioning mobile objects 110 and the at least one intermediate mobile object 115 without installing the plurality of positioning nodes at the predetermined locations in the region to be positioned, and the target node 121 far from the reference point 130 may also be positioned by expanding a positionable region.

Figure 6:
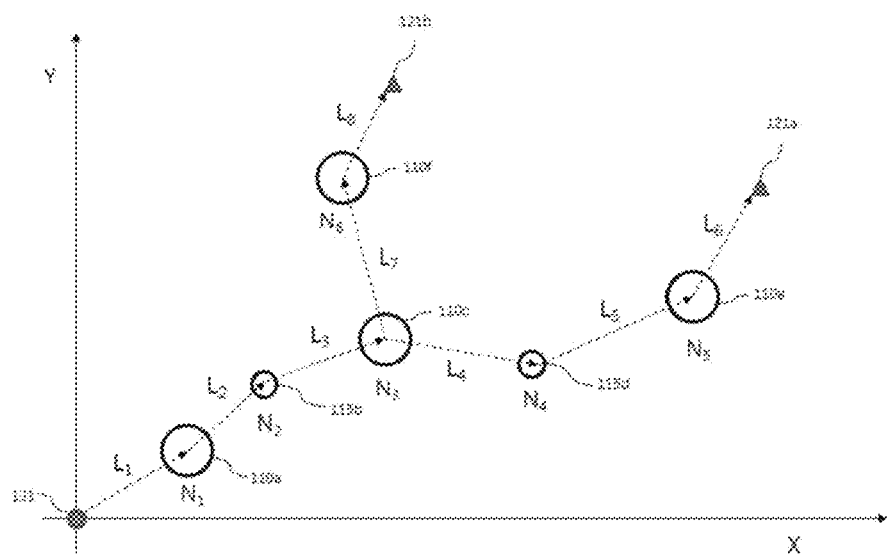

In addition, FIG. 6 illustrates positioning several objects 120 by using the plurality of positioning mobile objects 110 and a plurality of intermediate mobile objects 115 in the positioning network system 100 according to an embodiment of the present disclosure.

First, in the positioning network system 100 according to an embodiment of the present disclosure, when positioning a first target node 121a as illustrated in FIG. 6, the first target node 121a may be positioned by using the first positioning mobile object $N_1$ 110a, a second intermediate mobile object $N_2$ 115b, a third positioning mobile object $N_3$ 110c, a fourth intermediate mobile object $N_4$ 115d, and a fifth positioning mobile object $N_5$ 110e of the plurality of positioning mobile objects 110, which are scattered in the positioning region.

As a result, as can be seen in FIG. 6, in the positioning network system 100 according to an embodiment of the present disclosure, the location calculator 140 may calculate the location of the first target node 121a based on the reference node 131 by performing, through Equation 6 or the like, the vector sum for a first location vector $L_1$, a second location vector $L_2$, a third location vector $L_3$, a fourth location vector $L_4$, a fifth location vector $L_5$, and a sixth location vector $L_6$.

In addition, as can be seen in FIG. 6, when positioning a second target node 121b, the second target node 121b may be positioned by using a sixth positioning mobile object $N_6$ 110f in addition to the first positioning mobile object $N_1$ 110a, the second intermediate mobile object $N_2$ 115b, and the third positioning mobile object $N_3$ 110c, which are used in connection with the first target node 121a.

As a result, as can be seen in FIG. 6, the location calculator 140 may calculates the location of the second target node 121b based on the reference node 131 by performing, through Equation 6 or the like, the vector sum for the first location vector $L_1$, the second location vector $L_2$, the third location vector $L_3$, a seventh location vector $L_7$, and an eighth location vector $L_8$.

Further, in the positioning network system 100 according to an embodiment of the present disclosure, although a connection path (for example, connection path of $N_1$-$N_2$-$N_3$-$N_4$-$N_5$ with respect to the first target node 121a in FIG. 6) between the positioning mobile objects 110 and the intermediate mobile objects 115, which are used to position the target node 121, may be selected through, for example, an existing shortest path algorithm, the present disclosure should not be limited thereto.

At this time, in the positioning network system 100 according to an embodiment of the present disclosure, the first positioning mobile object 110a ($N_1$ in FIG. 6) may position, through the rear positioning, the first positioning mobile object 110a based on the reference node 131 of the predetermined reference point 130, and may also position, through the front positioning, the second intermediate mobile object 115b ($N_2$ in FIG. 6) based on the first positioning mobile object 110a. In addition, the $m^{th}$ positioning mobile object 110*m* (N$_3$ in FIG. 6) following the second intermediate mobile object 115*b* may position an m+1$^{th}$ positioning mobile object 110*m*+1 or an m+1$^{th}$ intermediate mobile object 115*m*+1 (N$_4$ in FIG. 6) based on the m$^{th}$ positioning mobile object 110*m* (where 1<m<K). In addition, a K$^{th}$ positioning mobile object 110K (N$_5$ in FIG. 6) may position the target node 121*a* of the object 120 based on the K$^{th}$ positioning mobile object 110K.

However, the present disclosure should not be limited thereto, and the m$^{th}$ positioning mobile object 110*m* (N$_3$ in FIG. 6) may position, through the front positioning and the rear positioning, the m−1$^{th}$ positioning mobile object or the intermediate mobile object together with the m+1$^{th}$ positioning mobile object or the intermediate mobile object (where 1<m<K), and the target node 121*a* of the object 120 may also be positioned by using this.

Figure 7:
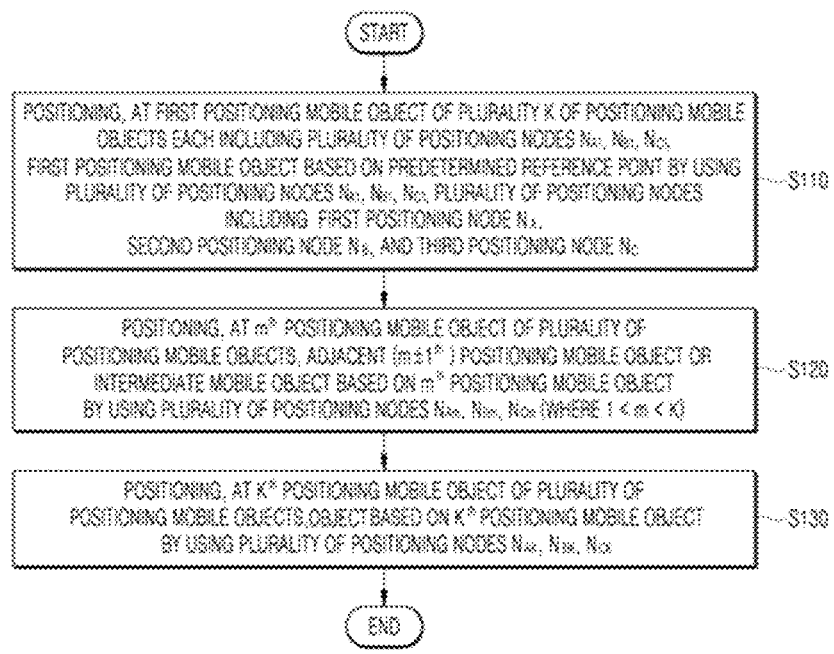
FIG. 7 is a flow chart of a positioning method according to an embodiment of the present disclosure.

FIG. 7 illustrates a flow chart of a positioning method according to an embodiment of the present disclosure.

The positioning method according to an embodiment of the present disclosure will be described below. However, since the present disclosure has been described in more detail above with respect to the positioning network system 100 according to an embodiment of the present disclosure, repeated description will be omitted below, and the gist of the present disclosure will be mainly described.

First, as can be seen in FIG. 7, a positioning method for positioning the object 120 by using the plurality of positioning mobile objects 110 and the at least one intermediate mobile object 115 according to an embodiment of the present disclosure includes positioning, at a first positioning mobile object 110*a* of the plurality K of positioning mobile objects 110 each including a plurality of positioning nodes, the first positioning mobile object 110*a* based on the predetermined reference point 130 by using a plurality of positioning nodes $N_{A1}$, $N_{B1}$, and $N_{C1}$, the plurality of positioning nodes including the first positioning node $N_A$ 111, the second positioning node $N_B$ 112, and the third positioning node $N_C$ 113 (S110); positioning, at the m$^{th}$ positioning mobile object 110*m* of the plurality of positioning mobile objects 110, the adjacent (m±1$^{th}$) positioning mobile object (that is, 110*m*+1 or 110*m*−1) or the intermediate mobile object (that is, 115*m*+1 or 115*m*−1) based on the m$^{th}$ positioning mobile object 110*m* by using the plurality of positioning nodes $N_{Am}$, $N_{Bm}$, and $N_C$ m (where 1<m<K) (S120); and positioning, at the K$^{th}$ positioning mobile object 110K of the plurality of positioning mobile objects 110, the object 120 based on the K$^{th}$ positioning mobile object 110K by using the plurality of positioning nodes $N_{AK}$, $N_{BK}$, and $N_{CK}$ (S130).

At this time, the object 120 includes the target node $N_T$ 121, the intermediate mobile object 115 includes the intermediate node $N_I$ 116, and at the positioning mobile object 110, the second positioning node $N_B$ and the third positioning node $N_C$ are located in a direction forming a right angle at the first positioning node $N_A$ in a right-angled triangle structure.

In addition, in the positioning method according to an embodiment of the present disclosure, it is preferable that the second positioning node $N_B$ and the third positioning node $N_C$ are located at the same distance from the first positioning node $N_A$ in a right-angled isosceles triangle structure.

At this time, the positioning method according to an embodiment of the present disclosure may further include calculating (not shown) the location of the object 120 based on the reference point 130 by sequentially summing location information of at least two of the plurality of positioning mobile objects 110 and the intermediate mobile object 115.

Further, calculating (not shown) the location may include calculating location information of the object 120 based on the reference point 130 by sequentially summing location information of the first positioning mobile object 110*a* based on the reference point 130, location information of the adjacent (m±1$^{th}$) positioning mobile object (that is, 110*m*+1 or 110*m*−1) or the intermediate mobile object (that is, 115*m*+1 or 115*m*−1) based on the m$^{th}$ positioning mobile object 110*m*, and location information of the object 120 based on the K$^{th}$ positioning mobile object 110K.

As a result, in the positioning method according to an embodiment of the present disclosure, the object 120 may be positioned without installing the plurality of positioning nodes at the predetermined locations in the region to be positioned, the object 120 may be positioned with high accuracy without complicating the calculation for positioning the object 120, and the object 120 far from the positioning reference point may be positioned by expanding the positionable region.

In addition, a computer program according to another embodiment of the present disclosure is a computer program stored in a computer-readable medium to execute each step of the above-described positioning method on a computer. The computer program may be a computer program including machine codes produced by a compiler as well as a computer program including higher-level language codes executable by the computer using, for example, an interpreter. At this time, the computer is not limited to a personal computer (PC), a notebook computer, or the like, and includes all information processing devices, such as a server, a smart phone, a tablet PC, a PDA, and a mobile phone, that are capable of executing the computer program by including a central processing unit (CPU).

The medium may be a medium for continuously storing a program executable by a computer, or temporarily storing the program for execution or download. In addition, the medium may be various recording means or storage means in a single form or in a combination of several pieces of hardware, but is not limited to a medium directly connected to any computer system, and may be distributed over a network. Examples of the medium include, but are not limited to: magnetic media such as hard disks, floppy disks, and magnetic tape; optical media such as CD-ROM disks and DVD-ROM disks; magneto-optical media such as floptical disks; and memories that are configured to store program codes, such as ROM, RAM, and flash memory. In addition, examples of other mediums include an App Store that distributes applications, a site that supplies or distributes various software, and a recording medium or a storage medium managed by, for example, a server.

Figure 8A:
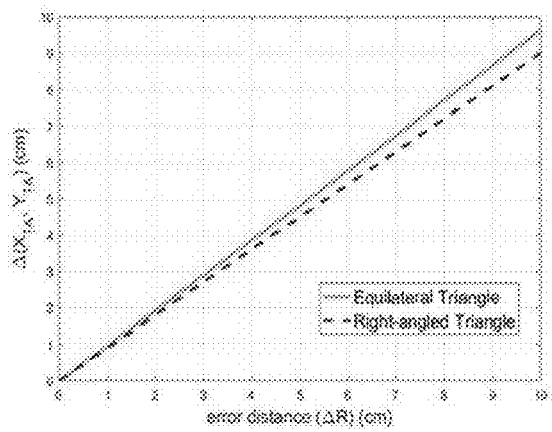
FIGS. 8A to 8C are graphs showing the performance of a positioning network system, apparatus, and method according to an embodiment of the present disclosure.
Figure 8B:
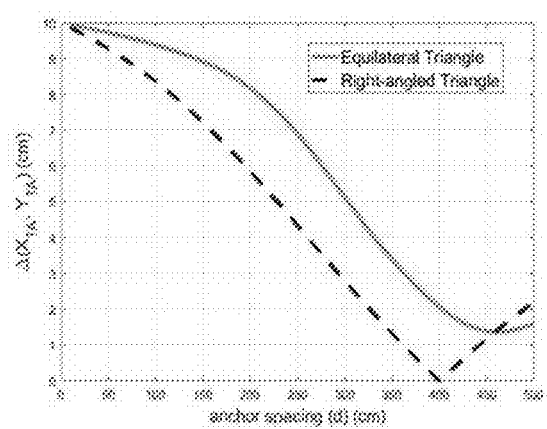
Figure 8C:
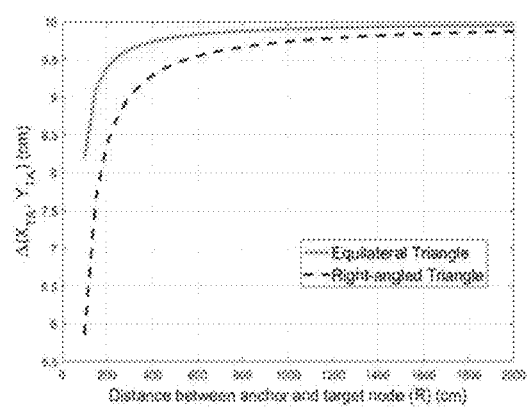

In addition, FIGS. 8A to 8C illustrate improvements in performance due to the positioning network system 100, apparatus, and method according to an embodiment of the present disclosure.

More specifically, as can be seen in FIG. 8A, according to the present disclosure, in both cases in which the plurality of positioning nodes are arranged to form a right-angled triangle structure and an equilateral triangle structure, positioning accuracy depending on the distance measurement error has a proportional relationship having a linear increase.

In addition, as can be seen in FIG. 8B, according to the present disclosure, the positioning accuracy depending on the distance d to the positioning node is higher in the case where a plurality of positioning nodes are arranged to form a right-angled triangle structure than in the case where the plurality of positioning nodes are arranged to form the equilateral triangle structure. Further, it can be seen that the positioning accuracy has a linearly inversely proportional relationship in the right-angled triangle structure, and has a nonlinearly inversely proportional relationship in the equilateral triangle structure.

Further, as can be seen in FIG. 8C, according to the present disclosure, the positioning accuracy depending on the distance between the positioning mobile object 110 and the node to be positioned $N_D$ such as the target node 121 is also higher in the case where the plurality of positioning nodes are arranged to form the right-angled triangle structure than in the case where the plurality of positioning nodes are arranged to form the equilateral triangle structure.

As a result, in the positioning network system 100, apparatus, and method using heterogeneous mobile objects according to an embodiment of the present disclosure, the object 120 may be positioned without installing the plurality of positioning nodes at the predetermined locations in the region to be positioned, the object 120 may be positioned with high accuracy without complicating the calculation for positioning the object 120, and the object 120 far from the reference point 130 may be positioned by expanding the positionable region.

Hereinafter, an embodiment of a positioning network system, apparatus, and method using homogeneous positioning mobile objects will be described.

Figure 9:
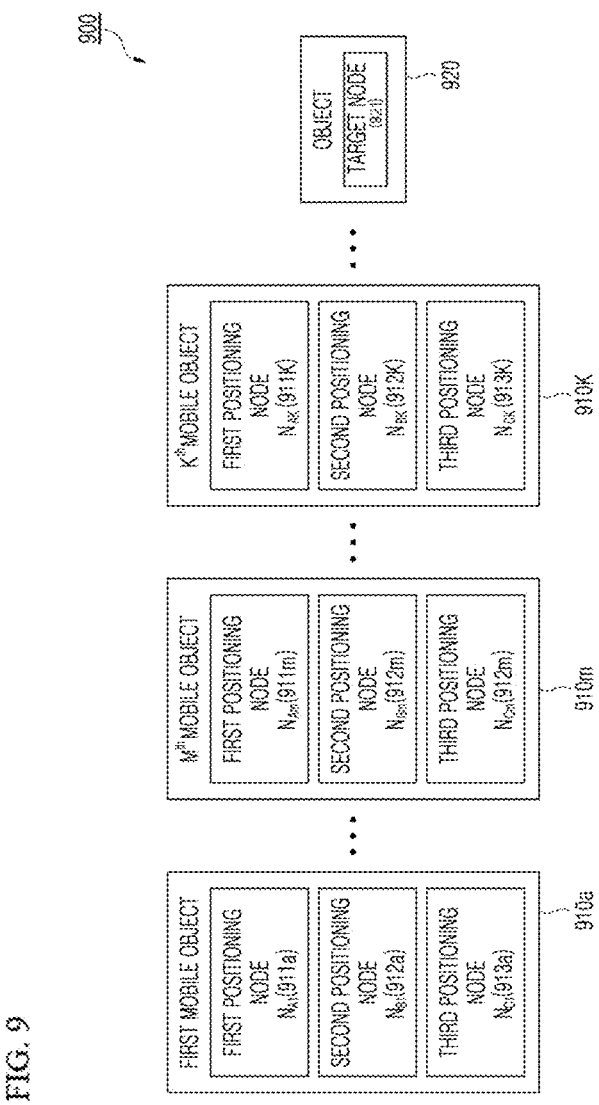
FIG. 9 is a diagram illustrating the configuration of a positioning network system according to another embodiment of the present disclosure.

First, FIG. 9 illustrates the configuration of a positioning network system 900 according to another embodiment of the present disclosure. As can be seen in FIG. 9, the positioning network system 900 according to another embodiment of the present disclosure is a positioning network system 900 for positioning an object by using a plurality of positioning mobile objects, and may include the plurality K of positioning mobile objects 910 each including a plurality of positioning nodes including a first positioning node $N_A$ 911, a second positioning node $N_B$ 912, and a third positioning node $N_C$ 913, an intermediate mobile object 115 including an intermediate node $N_I$ 116, and an object 920 including a target node $N_T$ 921.

At this time, at the plurality of positioning mobile objects 910, the second positioning node $N_B$ 912 and the third positioning node $N_C$ 913 are located in a direction forming a right angle at the first positioning node $N_A$ 911 in a right-angled triangle structure, a first positioning mobile object 910a of the plurality of positioning mobile objects 910 is configured to position the first positioning mobile object 910a based on a predetermined reference point 930 by using a plurality of positioning nodes $N_{A1}$, $N_{B1}$, and $N_{C1}$, at least one $m^{th}$ positioning mobile object 910m of the plurality of positioning mobile objects 910 is configured to position an $m-1^{th}$ positioning mobile object 910m-1 or an $m+1^{th}$ positioning mobile object 910m+1 based on the $m^{th}$ positioning mobile object 910m by using a plurality of positioning nodes $N_{Am}$, $N_{Bm}$, and $N_{Cm}$ (where 1<m<K), and a $K^{th}$ positioning mobile object 910K of the plurality of positioning mobile objects 910 is configured to position the object 920 based on the $K^{th}$ positioning mobile object 910K by using a plurality of positioning nodes $N_{AK}$, $N_{BK}$, and $N_{CK}$.

In addition, in the positioning network system 900 according to another embodiment of the present disclosure, the second positioning node $N_B$ 912 and the third positioning node $N_C$ 913 may be located at the same distance from the first positioning node $N_A$ 911 in the right-angled isosceles triangle structure.

In addition, the plurality of positioning mobile objects 910 may calculate a location $X_{AD}$, $Y_{AD}$ of a node to be positioned $N_D$ based on the first positioning node $N_A$ 911 of the plurality of positioning mobile objects 910 by calculating a first distance $X_{AD}$ from the first positioning node $N_A$ 911 to the node to be positioned $N_D$ on a first axis (X axis) connecting the first positioning node $N_A$ 911 and the second positioning node $N_B$ 912, and calculating a second distance $Y_{AD}$ from the first positioning node $N_A$ 911 to the node to be positioned $N_D$ on a second axis (Y axis) connecting the first positioning node $N_A$ 911 and the third positioning node $N_C$ 913.

In addition, the positioning network system 900 according to another embodiment of the present disclosure may include a location calculator 940 for calculating the location of the object 920 based on the reference point 930, and the location calculator 940 may be configured to calculate the location of the object 920 by sequentially summing location information of at least two of the plurality of positioning mobile objects 910.

At this time, the location calculator 940 may be implemented in one or two or more of the plurality of positioning mobile objects 910, or may be implemented in a separate device, such as a server, capable of exchanging data with the plurality of positioning mobile objects 910 through, for example, wireless communication.

More specifically, the location calculator 940 may be configured to calculate location information of the object 920 based on the reference point 930 by sequentially summing location information of the first positioning mobile object 910a based on the reference point 930, location information of the $m-1^{th}$ positioning mobile object 910m-1 or the $m+1^{th}$ positioning mobile object 910m+1 based on the $m^{th}$ positioning mobile object 910m, and location information of the object 920 based on the $K^{th}$ positioning mobile object 910K.

As a result, in the positioning network system 900 according to another embodiment of the present disclosure, the object 920 may be positioned without installing the plurality of positioning nodes at predetermined locations in a region to be positioned, the object 920 may be positioned with high accuracy without complicating the calculation for positioning the object 920, and the object 920 far from the reference point 930 may be positioned by expanding a positionable region.

Hereinafter, with reference to FIG. 9, the positioning network system 900 according to another embodiment of the present disclosure will be described in detail in terms of each component thereof.

First, the plurality of positioning mobile objects 910 may include the plurality of positioning nodes including the first positioning node $N_A$ 911, the second positioning node $N_B$ 912, and the third positioning node $N_C$ 913.

Figure 10:
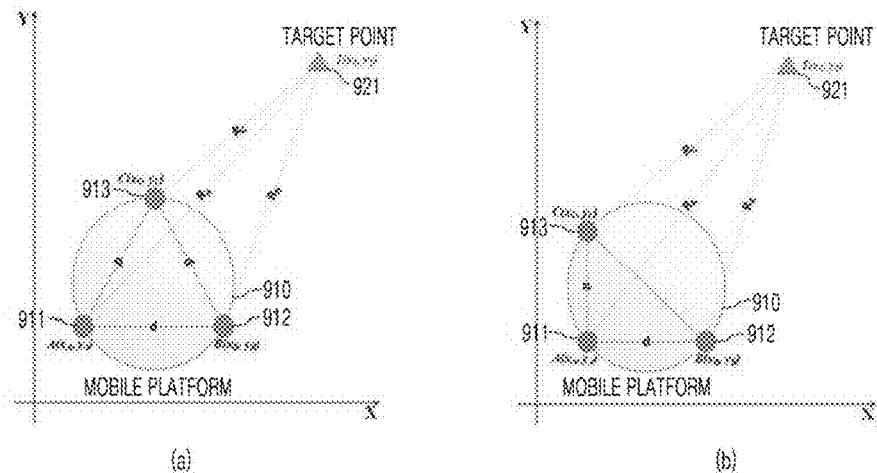
FIGS. 10 and 11 are diagrams illustrating the operation of a positioning network system according to another embodiment of the present disclosure.

More specifically, FIG. 10 illustrates the configuration and the operation of the positioning mobile object 910 according to another embodiment of the present disclosure.

First, as can be seen in FIG. 10(a), at the positioning mobile object 910, the first positioning node $N_A$ 911, the second positioning node $N_B$ 912, and the third positioning node $N_C$ 913 may be arranged to form an equilateral triangle. However, in this case, the positioning mobile object 910 calculates the distances $R_A$, $R_B$, $R_C$ from each of the first positioning node $N_A$ 911, the second positioning node $N_B$ 912, and the third positioning node $N_C$ 913 to the node to be positioned $N_D$, such as the target node $N_T$ 921 included in the object 920. As a result, the calculated location of the target node $N_T$ 921 based on the first positioning node $N_A$ 911 by using the calculated distances $R_A$, $R_B$, $R_C$ may be expressed as Equation 7 below:

$$x_{TA} = \frac{R_A^2 - R_B^2 + d^2}{2d}, \quad (7)$$

$$y_{TA} = \frac{R_A^2 - R_C^2 + d^2}{\sqrt{3}\,d} - \frac{1}{\sqrt{3}} x_T.$$

Here, as can be seen in FIG. 10(a), $X_{TA}$ refers to a first distance from the first positioning node $N_A$ 911 to the target node $N_T$ 921 on the first axis (X axis) connecting the first positioning node $N_A$ 911 and the second positioning node $N_B$ 912, and $Y_{TA}$ refers to a second distance from the first positioning node $N_A$ 911 to the target node $N_T$ 921 on the second axis (Y axis) connecting the first positioning node $N_A$ 911 and the third positioning node $N_C$ 913.

In addition, d refers to the distances between the first positioning node $N_A$ 911 and the second positioning node $N_B$ 912, between the first positioning node $N_A$ 111 and the third positioning node $N_C$ 913, and between the second positioning node $N_B$ 112 and the third positioning node $N_C$ 113, and $X_T$ refers to the location of the target node $N_T$ 921 on the X axis.

At this time, as can be seen in Equation 7, a location value $X_T$ of the target node $N_T$ 921 on the X axis is reflected to obtain the second distance $Y_{TA}$.

On the other hand, as can be seen in FIG. 10(b), in the positioning network system 900 according to another embodiment of the present disclosure, at the positioning mobile object 910, the second positioning node $N_B$ 912 and the third positioning node $N_C$ 913 are located in a direction forming a right angle at the first positioning node $N_A$ 911 in a right triangle structure.

As a result, the calculated location of the target node $N_T$ 921 based on the first positioning node $N_A$ 911 may be expressed as Equation 8 below:

$$\frac{R_A^2 - R_B^2 + d^2}{2d} = x_{TA}, \quad (8)$$

$$\frac{R_A^2 - R_C^2 + d^2}{2d} = y_{TA}.$$

Here, $X_{TA}$ refers to a first distance from the first positioning node $N_A$ 911 to the target node $N_T$ 921 on the first axis (X axis) connecting the first positioning node $N_A$ 911 and the second positioning node $N_B$ 912, and $Y_{TA}$ refers to a second distance from the first positioning node $N_A$ 911 to the target node $N_T$ 921 on the second axis (Y axis) connecting the first positioning node $N_A$ 911 and the third positioning node $N_C$ 913.

In addition, d refers to the distances from the first positioning node $N_A$ 911 to each of the second positioning node $N_B$ 912 and the third positioning node $N_C$ 913.

At this time, as can be seen in Equation 8, it is possible to calculate the first distance $X_{TA}$ without considering a location value $Y_T$ of the target node $N_T$ on the Y axis, and to calculate the second distance $Y_{TA}$ without considering a location value $X_T$ of the target node $N_T$ on the X axis.

That is, in the positioning network system 900 according to another embodiment of the present disclosure, since the positioning mobile objects 910, the second positioning node $N_B$ 912 and the third positioning node $N_C$ 913 are located in a direction forming a right angle at the first positioning node $N_A$ 911 in a right-angled triangle structure, the value on the X axis and the value on the Y axis do not affect each other (that is, decoupling). Therefore, the distance $R_A$ from the first positioning node $N_A$ 911 to the target node $N_T$ 921 is commonly reflected to obtain both $X_{TA}$ and $Y_{TA}$, while the distance $R_B$ from the second positioning node $N_B$ 912 to the target node $N_T$ 921 is reflected only to obtain $X_{TA}$, and the distance $R_C$ from the third positioning node $N_C$ 913 to the target node $N_T$ 921 is reflected only to obtain $Y_{TA}$.

Accordingly, in the positioning network system 900 according to another embodiment of the present disclosure, as can be seen in Equation 8, since the value on the X axis and the value on the Y axis do not affect each other (that is, decoupling), the first distance $X_{TA}$ and the second distance $Y_{TA}$ may be calculated through simpler calculations.

In particular, Equation 8 is for the case of a two-dimensional plane, but in the case of higher dimensions such as three-dimensions, Equation 8 becomes more complex, and thus more complex calculations should be performed.

Further, Equation 8 is for calculating the location of the object 920 based on the positioning mobile object 910, but in a more complicated situation in which the first distance $X_{TA}$ and the second distance $Y_{TA}$ are required to be calculated in a multi-stage connection structure in which another positioning mobile object 910 or another object 920 between the positioning mobile object 910 and the object 920 is additionally connected, it is possible to concisely model an equation for calculating the first distance $X_{TA}$ and the second distance $Y_{TA}$, and to effectively reduce an amount of calculation required therefor, by making the value on the X axis and the value on the Y axis not affect each other (that is, decoupling).

In addition, in the positioning network system 900 according to another embodiment of the present disclosure, it is possible to calculate the distance to the node to be positioned $N_D$ by causing the plurality of positioning nodes $N_A$, $N_B$, and $N_C$ to transmit and receive an RF signal to and from the node to be positioned $N_D$, and to calculate a relative location of the node to be positioned $N_D$ based on the positioning mobile object 910 by using the calculated distance.

At this time, although it is possible to calculate the distance to the node to be positioned $N_D$ by using, for example, a Time of Flight (ToF) technique while causing the plurality of positioning nodes $N_A$, $N_B$, and $N_C$ to transmit and receive the RF signal to and from the node to be positioned $N_D$, the present disclosure is not limited thereto, and may also calculate the distance to the node to be positioned $N_D$ by applying various techniques such as phase shift or frequency modulation.

Here, although the node to be positioned $N_D$ may be the target node $N_T$ 921 of the object 920, the reference node 931 of the reference point 930, or the first positioning node $N_A$ 911 of another mobile object 910, the present disclosure is not necessarily limited thereto, and may use various nodes such as a second positioning node $N_B$ 912, a third positioning node $N_C$ 913, or a separate fourth positioning node of the other mobile object 910.

In addition, in the positioning network system 900 according to another embodiment of the present disclosure, the positioning mobile object 910 may position a rear node $N_D$ as well as a front node $N_D$.

Figure 11:
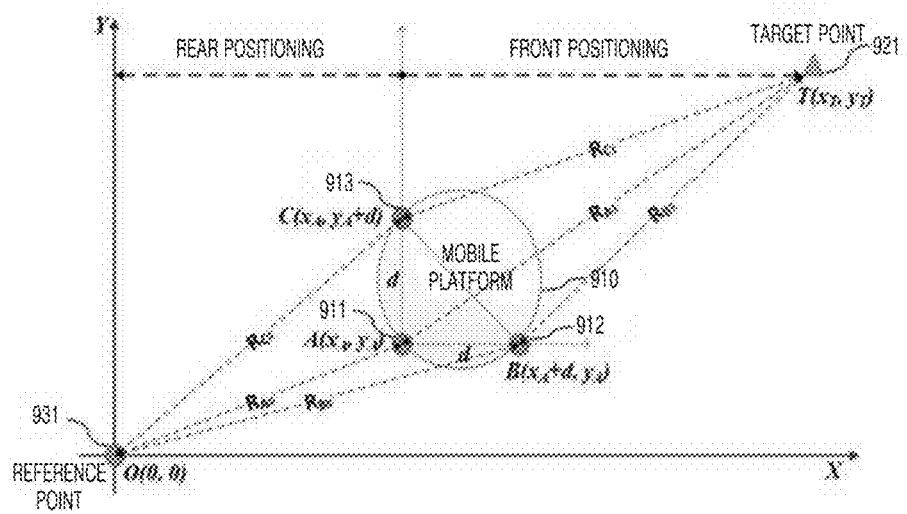

As can be seen in FIG. 11 as a more specific example, the positioning mobile object 910 may transmit and receive the RF signal to and from a target node $N_T$ of a front object 920 or a first positioning node $N_A$ of another positioning mobile object 910 by using the plurality of positioning nodes $N_A$, $N_B$, and $N_C$, such that it may perform a front positioning for the target node $N_T$ of the object 920 or the first positioning node $N_A$ of the other positioning mobile object 910. In addition, the positioning mobile object 910 may transmit and receive the RF signal to and from a reference node 931 of a rear reference point 930 or the first positioning node $N_A$ of the other positioning mobile object 910, such that it may perform a rear positioning for the reference node 931 of the reference point 930 or the first positioning node $N_A$ of the other positioning mobile object 910.

Accordingly, in FIG. 11, after the front positioning for the object 920 and the rear positioning for the reference point 930 are performed, calculating, through a vector sum, the location of the target node $N_T$ 921 of the object 920 based on the reference node 931 of the reference point 930 may be expressed as Equation 9 below:

$$x_T = \frac{R_{B_0}^2 - R_{A_0}^2}{2d} + \frac{R_{A_1}^2 - R_{B_1}^2}{2d}, \quad (9)$$

$$y_T = \frac{R_{C_0}^2 - R_{A_0}^2}{2d} + \frac{R_{A_1}^2 - R_{C_1}^2}{2d}.$$

Here, $X_{TA}$ refers to a first distance from the reference node 931 to the target node $N_T$ 921 on the first axis (X axis) connecting the first positioning node $N_A$ 911 and the second positioning node $N_B$ 912, and $Y_{TA}$ refers to a second distance from the reference node 931 to the target node $N_T$ 921 on the second axis (Y axis) connecting the first positioning node $N_A$ 911 and the third positioning node $N_C$ 913.

In addition, as can be seen in FIG. 4, $R_{A0}$, $R_{B0}$, $R_{C0}$ refer to the distances from the reference node 931 to each of the positioning nodes $N_A$, $N_B$, $N_C$ of the positioning mobile object 910, $R_{A1}$, $R_{B1}$, $R_{C1}$ refer to the distances from each of the positioning nodes $N_A$, $N_B$, $N_C$ of the positioning mobile object 910 to the target node $N_T$ of the object 920, and d refers to the distances from the first positioning node $N_A$ 911 to each of the second positioning node $N_B$ 912 and the third positioning node $N_C$ 913.

More specifically, the location of the reference node 931 of the reference point 930 may be measured and stored in advance. As a result, it is possible to calculate the distances $R_{A0}$, $R_{B0}$, $R_{C0}$ from each of the first positioning node $N_A$ 911, the second positioning node $N_B$ 912, and the third positioning node $N_C$ 913 of the positioning mobile object 910 to the reference node 931 by exchanging the RF signal between the first positioning node $N_A$ 911, the second positioning node $N_B$ 912, and the third positioning node $N_C$ 913, and the reference node 931, and to calculate the locations of the first positioning node $N_A$ 911, the second positioning node $N_B$ 912, and the third positioning node $N_C$ 913 by using the location of the reference node 931.

Further, when the locations of the first positioning node $N_A$ 911, the second positioning node $N_B$ 912, and the third positioning node $N_C$ 913 are calculated, it is possible to calculate the location (T($X_T$, $Y_T$) in FIG. 4) of the target node 931 based on the location ((0,0) in FIG. 11) of the reference node 931 in consideration of the location information of the object 920 based on the positioning mobile object 910.

Figure 12:
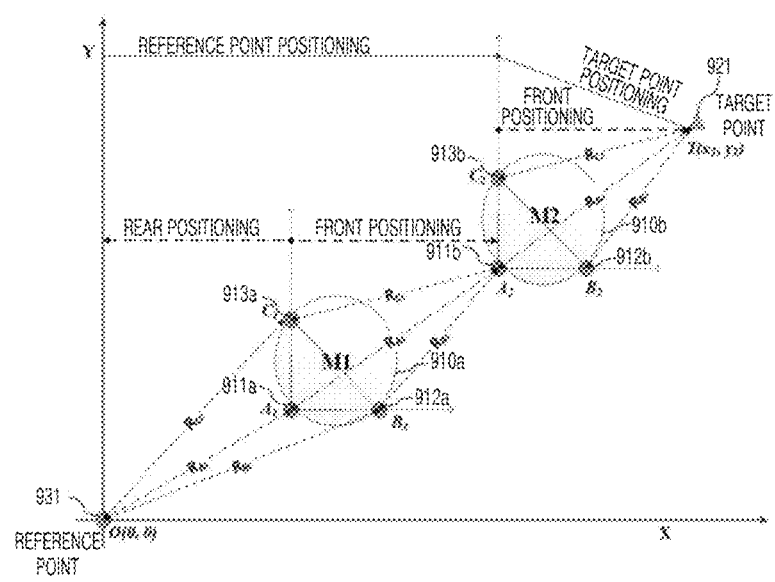
FIGS. 12 and 13 are diagrams illustrating the operation of a positioning network system including a plurality of positioning mobile objects according to an embodiment of the present disclosure.

In addition, FIG. 12 is a diagram illustrating the operation of the positioning network system 900 including the plurality of positioning mobile objects 110 according to another embodiment of the present disclosure.

FIG. 12 illustrates the configuration for positioning the object 920 by using two positioning mobile objects 110, but this is only for illustrating the explanation, and thus the present disclosure should not be limited thereto.

First, as can be seen in FIG. 12, a first positioning mobile object 910a performs a rear positioning for the reference node 931 of the reference point 930 by using a first positioning node 911a, a second positioning node 912a, and a third positioning node 913a.

In addition, the first positioning mobile object 910a performs a front positioning for a first reference node 911b of a second positioning mobile object 910b by using the first positioning node 911a, the second positioning node 912a, and the third positioning node 913a.

Further, the second positioning mobile object 910b performs the front positioning for the target node 921 of the object 920 by using the first positioning node 911b, the second positioning node 912b, and the third positioning node 913b.

As a result, in the positioning network system 900 according to another embodiment of the present disclosure, the location of the object 920 may be calculated through the vector sum by using location information of the first positioning node 911a of the first positioning mobile object 910a based on the reference node 931, position information of the first positioning node 911b of the second positioning mobile object 910b based on the first positioning node 911a of the first positioning mobile object 910a, and location information of the target node 921 based on the first positioning node 911b of the second positioning mobile object 910b, as in Equation 10 below:

$$\vec{TO} = \vec{TA_2} + \vec{A_2O}$$

$$\vec{A_2O} = \vec{A_2A_1} + \vec{A_1O} \quad (10)$$

In addition, when written in the same form as Equation 9, Equation 10 may be expressed as Equation 11 below:

$$x_T = \frac{R_{B_0}^2 - R_{A_0}^2}{2d} + \frac{R_{A_1}^2 - R_{B_1}^2}{2d} + \frac{R_{A_2}^2 - R_{B_2}^2 + d^2}{2d} \quad (11)$$

$$y_T = \frac{R_{C_0}^2 - R_{A_0}^2}{2d} + \frac{R_{A_1}^2 - R_{C_1}^2}{2d} + \frac{R_{A_2}^2 - R_{C_2}^2 + d^2}{2d}$$

Here, $X_T$ refers to the distance from the reference node 931 to the target node 921 on the first axis (X axis), and $Y_T$ refers to the distance from the reference node 931 to the target node 921 on the second axis (Y axis).

Further, although FIG. 12 illustrates calculating the location of the object 920 by connecting two positioning mobile objects 910 to each other, calculating the location of the object 920 by connecting k positioning mobile objects 910 to each other may be expressed as Equation 12 below:

$$x_T = \frac{R_{B_0}^2 - R_{A_0}^2}{2d} + \sum_{i=1}^{k} \frac{R_{A_1}^2 - R_{B_1}^2}{2d} + \frac{d}{2}(k-1) \quad (12)$$

$$y_T = \frac{R_{C_0}^2 - R_{A_0}^2}{2d} + \sum_{i=1}^{k} \frac{R_{A_1}^2 - R_{C_1}^2}{2d} + \frac{d}{2}(k-1)$$

As a result, in the positioning network system 900 according to another embodiment of the present disclosure, the target node 921 of the object 920 may be positioned by interlocking the plurality of positioning mobile objects 910 without installing the plurality of positioning nodes at the predetermined locations in the region to be positioned, and the target node 921 far from the reference point 930 may also be positioned by expanding a positionable region.

Figure 13:
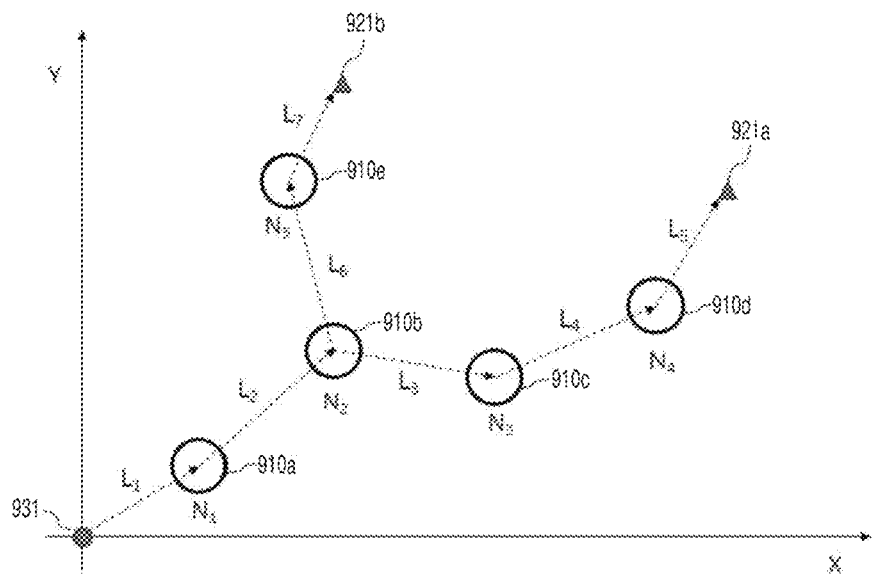

In addition, FIG. 13 illustrates positioning several objects 920 by using the plurality of positioning mobile objects 910 in the positioning network system 900 according to another embodiment of the present disclosure.

First, in the positioning network system 900 according to another embodiment of the present disclosure, when positioning a first target node 921a as illustrated in FIG. 13, the first target node 921a may be positioned by using the first positioning mobile object $N_1$ 910a, the second positioning mobile object $N_2$ 910b, the third positioning mobile object $N_3$ 910c, and the fourth positioning mobile object $N_4$ 910d of the plurality of positioning mobile objects 910, which are scattered in the positioning region.

As a result, as can be seen in FIG. 13, in the positioning network system 900 according to another embodiment of the present disclosure, the location calculator 940 may calculate the location of the first target node 921a based on the reference node 931 by performing, through Equation 12 or the like, the vector sum for a first location vector $L_1$, a second location vector $L_2$, a third location vector $L_3$, a fourth location vector $L_4$, and a fifth location vector $L_5$.

In addition, as can be seen in FIG. 13, when positioning a second target node 921b, the second target node 921b may be positioned by using a fifth positioning mobile object $N_5$ 910e in addition to the first positioning mobile object $N_1$ 910a and the second positioning mobile object $N_2$ 910b, which are used in the first target node 921a.

As a result, as can be seen in FIG. 13, the location calculator 940 may calculates the location of the second target node 921b based on the reference node 931 by performing, through Equation 12 or the like, the vector sum for the first location vector $L_1$, the second location vector $L_2$, and fourth location vector $L_4$.

Further, in the positioning network system 900 according to another embodiment of the present disclosure, although a connection path (for example, connection path of $N_1$-$N_2$-$N_3$-$N_4$ with respect to the first target node 921a in FIG. 12) between the positioning mobile objects 910, which are used to position the target node 921, may be selected through, for example, an existing shortest path algorithm, the present disclosure should not be limited thereto.

At this time, in the positioning network system 900 according to another embodiment of the present disclosure, the first positioning mobile object 910a ($N_1$ in FIG. 12) may position, through the rear positioning, the first positioning mobile object 910a based on the reference node 931 of the predetermined reference point 930, and may also position, through the front positioning, the second positioning mobile object 910b ($N_2$ in FIG. 12) based on the first positioning mobile object 910a. In addition, the $m^{th}$ positioning mobile object 910m ($N_2$, $N_3$ in FIG. 12) following the second positioning mobile object 910b may position an $m+1^{th}$ positioning mobile object 910m+1 ($N_3$, $N_4$ in FIG. 12) based on the $m^{th}$ positioning mobile object 910m (where 1<m<K). In addition, a $K^{th}$ positioning mobile object 910K ($N_4$ in FIG. 12) may position the target node 921a of the object 920 based on the $K^{th}$ positioning mobile object 910K.

However, the present disclosure should not be limited thereto, and the at least one $m^{th}$ positioning mobile object 910m ($N_2$, $N_3$ in FIG. 12) may position, through the front positioning and the rear positioning, $m-1^{th}$ positioning mobile object 910m-1 or $m+1^{th}$ positioning mobile object 910m+1 (where 1<m<K), and the target node 921a of the object 920 may also be positioned by using this.

Figure 14:
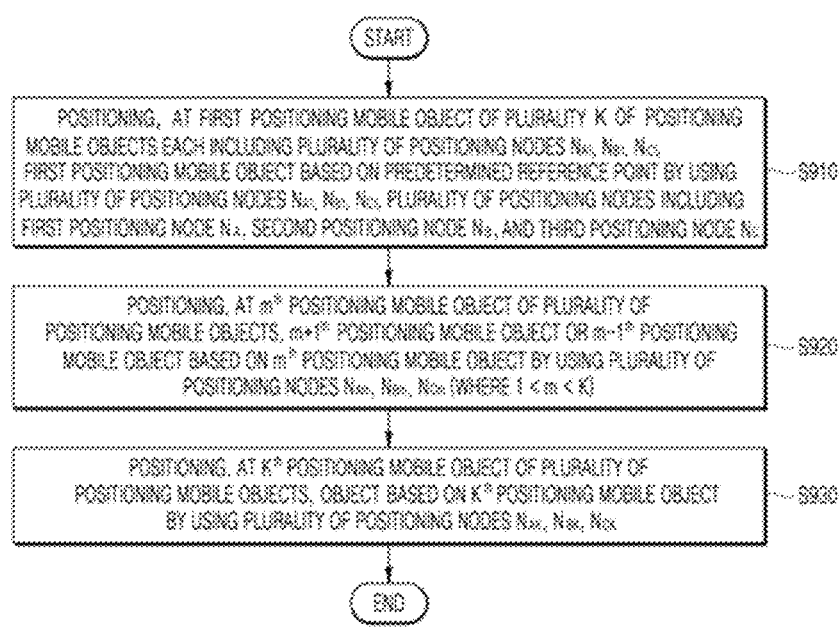
FIG. 14 is a flow chart of a positioning method according to another embodiment of the present disclosure.

FIG. 14 illustrates a flow chart of a positioning method according to another embodiment of the present disclosure.

The positioning method according to another embodiment of the present disclosure will be described below. However, since the present disclosure has been described in more detail above with respect to the positioning network system 900 according to another embodiment of the present disclosure, repeated description will be omitted below, and the gist of the present disclosure will be mainly described.

First, as can be seen in FIG. 14, the positioning method for positioning the object 920 by using the plurality of positioning mobile objects 910 according to another embodiment of the present disclosure includes positioning, at the first positioning mobile object 910a of the plurality K of positioning mobile objects 910 each including a plurality of positioning nodes, the first positioning mobile object 910a based on the predetermined reference point 930 by using the plurality of positioning nodes $N_{A1}$, $N_{B1}$, and $N_{C1}$, the plurality of positioning nodes including a first positioning node $N_A$ 911, a second positioning node $N_B$ 912, and a third positioning node $N_C$ 913 (S910); positioning, at the $m^{th}$ positioning mobile object 910m of the plurality of positioning mobile objects 910, the m-1$^{th}$ positioning mobile object 910m-1 or the m+1$^{th}$ positioning mobile object 910m+1 based on the $m^{th}$ positioning mobile object 910m by using the plurality of positioning nodes $N_{Am}$, $N_{Bm}$, and $N_C$ m (where 1<m<K) (S920); and positioning, at the $K^{th}$ positioning mobile object 910K of the plurality of positioning mobile objects 910, the object 920 based on the $K^{th}$ positioning mobile object 910K by using the plurality of positioning nodes $N_{AK}$, $N_{BK}$, and $N_{CK}$ (S930).

At this time, the object 920 includes the target node $N_T$ 921, and at the positioning mobile object 910, the second positioning node $N_B$ and the third positioning node $N_C$ are located in a direction forming a right angle at the first positioning node $N_A$ in a right-angled triangle structure.

In addition, in the positioning method according to another embodiment of the present disclosure, it is preferable that the second positioning node $N_B$ and the third positioning node $N_C$ are located at the same distance from the first positioning node $N_A$ in a right-angled isosceles triangle structure.

At this time, the positioning method according to another embodiment of the present disclosure may further include calculating (not shown) the location of the object 920 based on the reference point 930 by sequentially summing location information of at least two of the plurality of positioning mobile objects 110.

Further, calculating (not shown) the location may include calculating location information of the object 920 based on the reference point 930 by sequentially summing location information of the first positioning mobile object 910a based on the reference point 930, location information of the m-1$^{th}$ positioning mobile object 910m-1 or the m+1$^{th}$ positioning mobile object 910m+1 based on the $m^{th}$ positioning mobile object 910m, and location information of the object 920 based on the $K^{th}$ positioning mobile object 910K.

As a result, in the positioning method according to another embodiment of the present disclosure, the object 920 may be positioned without installing the plurality of positioning nodes at the predetermined locations in the region to be positioned, the object 920 may be positioned with high accuracy without complicating the calculation for positioning the object 920, and the object 920 far from the positioning reference point may be positioned by expanding the positionable region.

In addition, FIGS. 8A to 8C illustrate improvements in performance due to the positioning network system 900, apparatus, and method according to another embodiment of the present disclosure.

More specifically, as can be seen in FIG. 8A, according to the present disclosure, in both cases in which the plurality of positioning nodes are arranged to form a right-angled triangle structure and an equilateral triangle structure, positioning accuracy depending on the distance measurement error has a proportional relationship having a linear increase.

In addition, as can be seen in FIG. 8B, according to the present disclosure, the positioning accuracy depending on the distance d to the positioning node is higher in the case where a plurality of positioning nodes are arranged to form a right-angled triangle structure than in the case where the plurality of positioning nodes are arranged to form the equilateral triangle structure. Further, it can be seen that the positioning accuracy has a linearly inversely proportional relationship in the right-angled triangle structure, and a nonlinearly inversely proportional relationship in the equilateral triangle structure.

Further, as can be seen in FIG. 8C, according to the present disclosure, the positioning accuracy depending on the distance between the positioning mobile object 910 and the node to be positioned $N_D$ such as the target node 921 is also higher in the case where the plurality of positioning nodes are arranged to form a right-angled triangle structure than in the case where the plurality of positioning nodes are arranged to form the equilateral triangle structure.

As a result, in the positioning network system 900, apparatus, and method using homogeneous positioning mobile objects according to another embodiment of the present disclosure, the object 920 may positioned without installing the plurality of positioning nodes at the predetermined locations in the region to be positioned, the object 920 may be positioned with high accuracy without complicating the calculation for positioning the object 920, and the object 920 far from the reference point 930 may be positioned by expanding the positionable region.

The foregoing is merely illustrative of the technical idea of the present disclosure, and those skilled in the art to which the present disclosure pertains may make various modifications and changes without departing from the essential characteristics of the present disclosure. Therefore, the embodiments described in the present disclosure are not intended to limit the technical idea thereof but to explain, and the technical idea of the present disclosure should be not limited to these embodiments. The protection scope of the present disclosure should be interpreted by the following claims, and all technical ideas within the scope equivalent thereto should be construed as being included in the scope of the present disclosure.

STATEMENT REGARDING GOVERNMENT SUPPORT

This invention was supported at least in part by Ministry of Science and ICT of South Korean government for research projects, the first title of which is "Development For Real Time In-Door Localizing Technique" and the first project code number is 2019010015, the second title of which is "Development And Commercialization For Future Car" and the second project code number is 2019010014, managed by DGIST (DAEGU GYEONGBUK INSTITUTE OF SCIENCE AND TECHNOLOGY).

DESCRIPTION OF SYMBOLS

100, 900: positioning network system
110, 910: positioning mobile object
111, 911: first positioning node
112, 912: second positioning node
113, 913: third positioning node
115, 915: intermediate mobile object
116, 916: intermediate node
120, 920: object
121, 921: target node
130, 930: reference point
131, 931: reference node
140, 940: location calculator

What is claimed is:

1. A positioning network system for positioning an object by using a plurality of positioning mobile objects, comprising:

the plurality K of positioning mobile objects each including a plurality of positioning nodes, the plurality of positioning nodes including a first positioning node $N_A$, a second positioning node $N_B$, and a third positioning node $N_C$; and the object including a target node $N_T$, wherein at the plurality of positioning mobile objects, the second positioning node $N_B$ and the third positioning node $N_C$ are located in a direction forming a right angle at the first positioning node $N_A$ in a right-angled triangle structure, wherein a first positioning mobile object of the plurality of positioning mobile objects is configured to position the first positioning mobile object based on a predetermined reference point by using a plurality of positioning nodes $N_{A1}$, and $N_{C1}$, wherein at least one $m^{th}$ positioning mobile object of the plurality of positioning mobile objects is configured to position an adjacent ($m\pm1^{th}$) positioning mobile object or an intermediate mobile object including an intermediate node $N_1$ based on the $m^{th}$ positioning mobile object by using a plurality of positioning nodes $N_{Am}$, $N_{Bm}$, and $N_{Cm}$, where 1<m<K, wherein a $K^{th}$ positioning mobile object of the plurality of positioning mobile objects is configured to position the object based on the $K^{th}$ positioning mobile object by using a plurality of positioning nodes $N_{AK}$, $N_{BK}$, and $N_{CK}$, and wherein K and m are an integer greater than 1.

2. The positioning network system of claim 1, wherein the second positioning node $N_B$ and the third positioning node $N_C$ are located at the same distance from the first positioning node $N_A$ in a right-angled isosceles triangle structure.

3. The positioning network system of claim 2, wherein the plurality of positioning mobile objects are configured to calculate a location $X_{AD}$, $Y_{AD}$ of a node to be positioned $N_D$ based on the first positioning node $N_A$ of the plurality of positioning mobile objects, by:

calculating a first distance $X_{AD}$ from the first positioning node $N_A$ to the node to be positioned $N_D$ on a first axis (X axis) connecting the first positioning node $N_A$ and the second positioning node $N_B$, and calculating a second distance $Y_{AD}$ from the first positioning node $N_A$ to the node to be positioned $N_D$ on a second axis (Y axis) connecting the first positioning node $N_A$ and the third positioning node $N_C$.

4. The positioning network system of claim 3, wherein the plurality of positioning mobile objects are configured to:
    calculate the first distance $X_{AD}$ without considering a location value $Y_D$ of the node to be positioned $N_D$ on the Y axis, and calculate the second distance $Y_{AD}$ without considering a location value $X_D$ of the node to be positioned $N_D$ on the X axis.

5. The positioning network system of claim 3, wherein the plurality of positioning mobile objects are configured to:
    calculate the distance to the node to be positioned $N_D$ by causing the plurality of positioning nodes $N_A$, $N_B$, and $N_C$ to transmit and receive an RF signal to and from the node to be positioned $N_D$, and
    calculate a relative location of the node to be positioned $N_D$ based on the plurality of positioning mobile objects.

6. The positioning network system of claim 1, wherein the first positioning mobile object is further configured to position a second positioning mobile object or a second intermediate mobile object based on the first positioning mobile object by using the plurality of positioning nodes $N_{A1}$, $N_{B1}$, and $N_{C1}$, and
    wherein the $m^{th}$ positioning mobile object is further configured to position an $m-1^{th}$ positioning mobile object or an intermediate mobile object together with an $m+1^{th}$ positioning mobile object or the intermediate mobile object based on the $m^{th}$ positioning mobile object by using the plurality of positioning nodes $N_{Am}$, $N_{Bm}$, and $N_{Cm}$, where 1<m<K.

7. The positioning network system of claim 1, wherein the first positioning mobile object is further configured to position a second positioning mobile object based on the first positioning mobile object by using the plurality of positioning nodes $N_{A1}$, $N_{B1}$, and $N_{C1}$, and
    wherein the $m^{th}$ positioning mobile object is configured to position an $m+1^{th}$ positioning mobile object based on the $m^{th}$ positioning mobile object by using the plurality of positioning nodes $N_{Am}$, $N_{Bm}$, and $N_{Cm}$, where 1<m<K.

8. The positioning network system of claim 1, further comprising a location calculator for calculating the location of the object based on the reference point,
    wherein the location calculator is configured to calculate the location of the object by sequentially summing location information of at least two of the plurality of positioning mobile objects or the intermediate mobile object.

9. The positioning network system of claim 8, wherein the location calculator is further configured to calculate location information of the object based on the reference point by sequentially summing location information of the first positioning mobile object based on the reference point, location information of the adjacent ($m\pm1^{th}$) positioning mobile object or the intermediate mobile object based on the $m^{th}$ positioning mobile object, and location information of the object based on the $K^{th}$ positioning mobile object.

10. A positioning method for positioning an object by using a plurality of positioning mobile objects, comprising:
    positioning, at a first positioning mobile object of a plurality K of positioning mobile objects each including a plurality of positioning nodes, the first positioning mobile object based on a predetermined reference point by using the plurality of positioning nodes $N_{A1}$, $N_{B1}$, and $N_{C1}$, the plurality of positioning nodes including a first positioning node $N_A$, a second positioning node $N_B$, and a third positioning node $N_C$;
    positioning, at an $m^{th}$ positioning mobile object of the plurality of positioning mobile objects, an adjacent ($m\pm1^{th}$) positioning mobile object or an intermediate mobile object including an intermediate node $N_I$ based on the $m^{th}$ positioning mobile object by using a plurality of positioning nodes $N_{Am}$, $N_{Bm}$, and $N_{Cm}$, where 1<m<K; and
    positioning, at a $K^{th}$ positioning mobile object of the plurality of positioning mobile objects, the object based on the $K^{th}$ positioning mobile object by using a plurality of positioning nodes $N_{AK}$, $N_{BK}$, and $N_{CK}$,
    wherein the object comprises a target node $N_T$,
    wherein at the plurality of positioning mobile objects, the second positioning node $N_B$ and the third positioning node $N_C$ are located in a direction forming a right angle at the first positioning node $N_A$ in a right-angled triangle structure, and
    wherein K and m are an integer greater than 1.

11. The positioning method of claim 10, wherein the second positioning node $N_B$ and the third positioning node $N_C$ are located at the same distance from the first positioning node $N_A$ in a right-angled isosceles triangle structure.

12. The positioning method of claim 10, wherein the first positioning mobile object is configured to position a second positioning mobile object or a second intermediate mobile object based on the first positioning mobile object by using the plurality of positioning nodes $N_{A1}$, $N_{B1}$, and $N_{C1}$, and
    wherein the $m^{th}$ positioning mobile object is configured to position an $m-1^{th}$ positioning mobile object or the intermediate mobile object together with an $m+1^{th}$ positioning mobile object or the intermediate mobile object based on the $m^{th}$ positioning mobile object by using the plurality of positioning nodes $N_{Am}$, $N_{Bm}$, and $N_{Cm}$, where 1<m<K.

13. The positioning method of claim 10, wherein the first positioning mobile object is configured to position a second positioning mobile object based on the first positioning mobile object by using the plurality of positioning nodes $N_{A1}$, $N_{B1}$, and $N_{C1}$, and
    wherein the $m^{th}$ positioning mobile object is configured to position the $m+1^{th}$ positioning mobile object based on the $m^{th}$ positioning mobile object by using the plurality of positioning nodes $N_{Am}$, $N_{Bm}$, and $N_{Cm}$, where 1<m<K.

14. The positioning method of claim 10, further comprising calculating the location of the object based on the reference point by sequentially summing location information of at least two of the plurality of positioning mobile objects or the intermediate mobile object.

15. The positioning method of claim 14, wherein calculating the location comprises calculating location information of the object based on the reference point by sequentially summing location information of the first positioning mobile object based on the reference point, location information of the adjacent ($m\pm1^{th}$) positioning mobile object or the intermediate mobile object based on the $m^{th}$ positioning mobile object, and location information of the object based on the $K^{th}$ positioning mobile object.

* * * * *